United States Patent
Guerra et al.

(10) Patent No.: US 11,149,855 B2
(45) Date of Patent: Oct. 19, 2021

(54) COMPRESSION SEAL FOR USE ON RECIPROCATING PUMP

(71) Applicants: Jesse Guerra, Banquete, TX (US); Adrian R. Sandoval, Orange Grove, TX (US); Jose C. Garcia, Jr., Alice, TX (US)

(72) Inventors: Jesse Guerra, Banquete, TX (US); Adrian R. Sandoval, Orange Grove, TX (US); Jose C. Garcia, Jr., Alice, TX (US)

(73) Assignee: VP Sales and Company LP, Alice, TX (US)

(*) Notice: Subject to any disclaimer, the term of this patent is extended or adjusted under 35 U.S.C. 154(b) by 0 days.

(21) Appl. No.: 16/409,280

(22) Filed: May 10, 2019

(65) Prior Publication Data

US 2019/0353251 A1 Nov. 21, 2019

Related U.S. Application Data

(60) Provisional application No. 62/672,294, filed on May 16, 2018.

(51) Int. Cl.
*F16J 15/16* (2006.01)
*F04B 39/12* (2006.01)
*F04B 1/0448* (2020.01)
*F04B 53/16* (2006.01)

(52) U.S. Cl.
CPC ........... *F16J 15/166* (2013.01); *F04B 1/0448* (2013.01); *F04B 39/12* (2013.01); *F04B 53/16* (2013.01)

(58) Field of Classification Search
CPC ........ F04B 53/007; F04B 53/16; F04B 39/12; F04B 39/121; F04B 39/122; F04B 39/125; F04B 7/0088
See application file for complete search history.

(56) References Cited

U.S. PATENT DOCUMENTS

| | | | |
|---|---|---|---|
| 3,373,695 A | 3/1968 | Yohpe | |
| 4,771,801 A * | 9/1988 | Crump | F04B 49/121 137/68.26 |
| 4,878,815 A | 11/1989 | Stachowiak | |
| 5,073,096 A * | 12/1991 | King | F04B 53/007 137/516.29 |
| 5,299,921 A * | 4/1994 | Richter | F04B 53/1022 285/125.1 |
| 5,382,057 A * | 1/1995 | Richter | F04B 53/00 285/354 |
| 8,444,398 B2 * | 5/2013 | Brunet | F04B 47/02 137/15.18 |

(Continued)

OTHER PUBLICATIONS

MachineDesign, Intro and Compression Seals, Nov. 15, 2002 (https://www.machinedesign.com/mechanical-motion-systems/hydraulics/article/21812626/intro-and-compression-seals) (Year: 2002).*

*Primary Examiner* — Dominick L Plakkoottam
(74) *Attorney, Agent, or Firm* — M. Susan Spiering; Ochoa & Associates, P.C.

(57) ABSTRACT

The present invention is directed to use of a combined seal involving a compression seal coupled with a metal-to-metal seal for use on the suction and discharge side of the plunger portion of a reciprocating pump. This combined seal results in less vibratory movement and better pumping during use of the pump, and an overall more efficient pump based on the improved seal.

10 Claims, 11 Drawing Sheets

(56) References Cited

U.S. PATENT DOCUMENTS

| | | | | |
|---|---|---|---|---|
| 8,915,722 | B1* | 12/2014 | Blume | F04B 53/007 |
| | | | | 137/543.23 |
| 9,188,123 | B2* | 11/2015 | Hubenschmidt | F04B 53/007 |
| 10,094,376 | B1 | 10/2018 | Vicars | |
| 10,273,954 | B2* | 4/2019 | Brown | F04B 1/0448 |
| 10,465,680 | B1* | 11/2019 | Guerra | F04B 53/16 |
| 2008/0138224 | A1* | 6/2008 | Vicars | F04B 53/007 |
| | | | | 417/545 |
| 2013/0319220 | A1* | 12/2013 | Luharuka | F04B 53/164 |
| | | | | 92/165 R |
| 2014/0348677 | A1* | 11/2014 | Moeller | F16K 15/063 |
| | | | | 417/559 |
| 2018/0291892 | A1* | 10/2018 | Vicars | F16K 27/0209 |
| 2019/0063430 | A1* | 2/2019 | Byrne | F04B 53/16 |
| 2019/0353251 | A1* | 11/2019 | Guerra | F04B 53/16 |
| 2019/0360599 | A1* | 11/2019 | Yeung | F16K 1/42 |

\* cited by examiner

SECTION C-C

SECTION D-D

COMPRESSION SEAL FOR USE ON RECIPROCATING PUMP

CLAIM FOR PRIORITY

This Non-provisional patent application is based on U.S. Provisional Patent Application Ser. No. 62/672,294, filed on May 16, 2018, the priority of which is claimed, and the disclosure of which is incorporated by reference.

FIELD OF THE INVENTION

The present invention relates to a reciprocating pump. More particularly, the present invention relates to an improved seal mechanism for the discharge and suction bores found in a fluid end assembly of a reciprocating pump and utilizes a combination of metal to metal seal and compression seal.

BACKGROUND

A reciprocating pump is a positive-displacement pump that typically utilizes a crankshaft mechanism for pumping fluid at high pressures. Examples of the reciprocating pump include piston pumps, plunger pumps, and diaphragm pumps. The reciprocating pump is used to pump fluid into a storage container for storing the fluid. A plunger pump includes a plunger that reciprocates in a chamber and creates volume changes that result in flow of fluid in to and out of the chamber. When the plunger retracts, the fluid flows into the chamber. When the plunger extends, the fluid is forced out of the chamber. The reciprocating pump usually includes a fluid end that receives the fluid through an inlet bore, and ejects the fluid from an outlet bore. The fluid end includes multiple threaded bores for facilitating the reciprocating motion of a plurality of plungers. The plungers perform a reciprocating motion through multiple threaded bores for facilitating the motion of high pressure fluid through the fluid end.

A compression seal broadly is a device that joins parts in a system or mechanism together and prevents leakage of usually fluids from the device. The seal generally is for containing pressure and/or excluding contamination in a given device. The effectiveness of a seal is dependent upon how well the parts are adhering together, and maintain the adhesion despite pressure within the system or vibrations occurring.

Presently, conventional reciprocating pumps utilized in fluid end assemblies utilize radial seals. These are often D- or O-rings or lip seals. Since these rings are often elastomeric materials, it is found that during operation of the pumps, the oscillations often cause the seals to weaken and deform. This results in leakage of fluid and media into the pump and fluid end assembly, and subsequent damage to the pump, up to and including pump failure. These elastomeric (rubber type) seals must be stretched over the part and deformed to install, therefore during use they generally deform further. Problems arise when the deformity is at critical mass or one or all of the following: blow by, extensive extrusion between metal components, nibbling. Material wedged into the extrusion gap and seal expansion complicates removal of the suction cap (or discharge cap). It is difficult for an operator to remove the cap and radial seal because of frictional forces.

As with most seals, radial seals, like D-Rings or O-Rings require a certain amount of compression to operate. In the case of a fluid end with D-Rings, the compression is generated by forcing the seal into a gap with a determinate size between a plug and receiving bore. Forcing the sealing plug into place is typically done by striking it with a hammer or using the cover nut like a screw press to generate enough force to install it. The amount of force to install the seal, and often more due to environmental factors, must be used to remove the plug from the bore. This typically involves the use of a purpose built puller.

As D-rings degrade and erode, they begin to leak. In the case of hydraulic fracturing, this typically means abrasive media is leaking past the seal and begins to wash and wear the receiving bore of the plug. Since the sealing bore and gap between the plug and bore is now larger, a new seal will have a reduced performance and useful life because the compression required to operate is diminished. In some circumstances, the bore will be worn to an extent that even new seals will not operate. This is a common issue in typical fluid ends. Due to the complexity and time required to remove components and replace seals, minor leaks that do not significantly affect pumping operations are often ignored during short time intervals between stages. This behavior exacerbates sealing issues. There exists a need for a sealing arrangement that does not have diminished performance due to typical wear and is easier and faster to maintain during short intervals.

U.S. Pat. No. 3,373,695 to Yohpe discloses a reciprocating piston pump having exterior nuts for connecting cover members with the wall member (components identified as 27 and 47).

U.S. Pat. No. 4,878,815 to Stachowiak discloses a high pressure reciprocating pump apparatus and illustrates prior art use of a common seat for both the suction and discharge valves thus requiring fewer parts for the pump. (col 2, line 40). It is considered relevant disclosure as a reference interested in designing the fluid end assembly and pump to be more operator friendly while maintaining or improving the pressure specifications of the pump.

In spite of others recognizing that vibrations during operation of the pump result in damage to the pump, the problem has not yet been solved, and there remains a need for a design which can withstand the pressures of 15000 psi gauge during use and remain operational for over 1000 hours with minimal operator input and maintenance.

SUMMARY OF THE INVENTION

The present invention is directed to use of a combined seal involving a compression seal coupled with a metal-to-metal seal for use on the suction and discharge side of the plunger portion of a reciprocating pump. This combined seal results in less vibratory movement, less leaking and better pumping during use of the pump, and an overall more efficient pump based on the improved seal.

Disclosed herein is a seal for use with a fluid end assembly for a reciprocating pump that receives fluid through an inlet bore, and ejects fluid from an outlet bore, the fluid end comprising: a body; a plunger bore formed in the body along a first axis; a suction bore formed in the body along a second axis, wherein the suction bore receives fluid from a conduit; a discharge bore formed in the body, aligned perpendicular to the plunger bore and designed to receive a discharge cover; the fluid end further comprising a horizontal bore formed in the body and aligned with the plunger bore, wherein the plunger bore, the suction bore, the discharge bore, and the horizontal bore intersect to form a cavity; a reciprocating plunger that reciprocates in the plunger bore; an inlet valve received by the suction bore for facilitating flow of the fluid from the conduit into the cavity by way of the suction bore; a first valve seat deck at an end portion of the suction bore and in contact with the inlet valve; a pressure relief valve received by the discharge bore for facilitating flow of the fluid from the cavity into the discharge bore; a discharge cover received by the discharge bore and in contact with the pressure relief valve; a second valve seat deck at an end portion of the discharge bore and in contact with the pressure relief valve; and an outlet pocket that is defined at an inner surface of the discharge bore and provides a passage for flow of the fluid from the discharge bore to the pump outlet; the pump outlet is cylindrical and is aligned along a third axis, wherein the inlet valve allows the fluid to flow into the cavity based on a reciprocating motion of the reciprocating plunger by way of the suction bore, wherein the pressure relief valve allows the fluid to flow from the cavity to the discharge bore based on the reciprocating motion of the reciprocating plunger; wherein further the discharge and suction bores are sealed by a compression seal in conjunction with a metal to metal seal that minimizes the sealing extrusion gap; and the suction and discharge covers are made with a section having a radius corresponding to the suction or discharge bore radius, respectively, or essentially to match, generally for example between 2 and 3 inches, or in some assemblies between 4 and 5 inches, that meets with a bevel in the fluid end body that forms a metal to metal seal. The radius can change based on the needs of the user and the desired pump size. The beveled angle can range from about 35-55 degrees with 40-50 degrees being preferred and 45 degrees being most preferred. The critical consideration with the angle is that it mates properly and accurately with the bore wall and beveled surface. The inventive seal can maintain pressures of up to 15,000 psig.

Further disclosed are suction and discharge covers which are secured into the fluid end using retainer nuts that when the retainer nuts are struck upon their lugs, tighten against the covers, providing the necessary compression to seal the elastomeric seal.

Other aspects and advantages of the present invention are described in the detailed description below and in the claims.

BRIEF DESCRIPTION OF THE DRAWINGS

The invention is described in detail below with reference to the appended drawings, wherein like numerals designate similar parts. In the Figures.

DETAILED DESCRIPTION OF THE INVENTION

Figure 1:
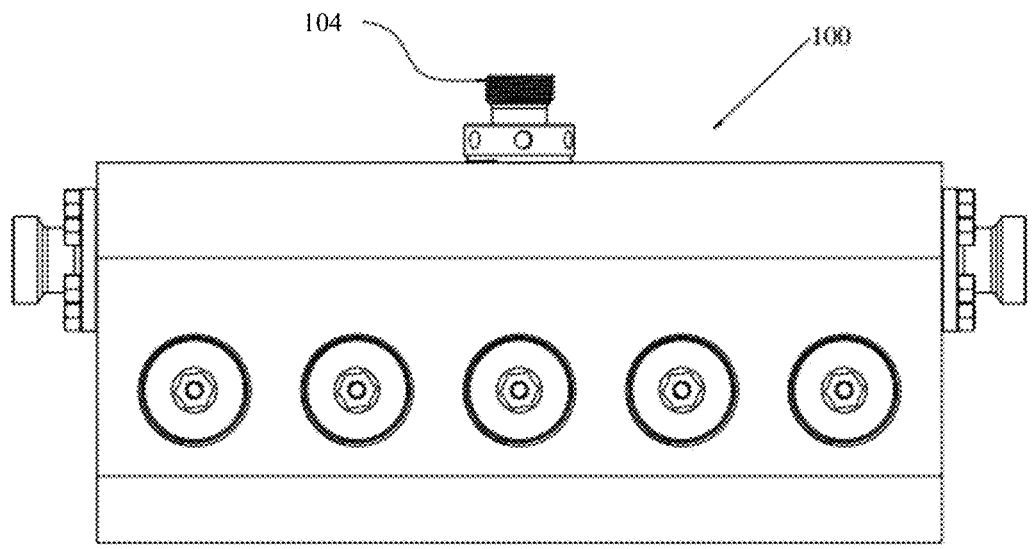
FIG. 1 illustrates a front view of a conventional, prior art fluid end assembly having recessed internal hex nuts housed within the assembly.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

With respect to the various ranges set forth herein, any upper limit recited may, of course, be combined with any lower limit for selected sub-ranges.

The transitional phrase "consisting essentially of" limits the scope of a claim to the specified materials or steps "and those that do not materially affect the basic and novel characteristic(s)" of the claimed invention. Unless otherwise indicated or readily apparent, an article consists essentially of the recited components when the article includes 90% or more of the recited components. That is, the terminology excludes more than 10% unrecited components.

As used herein, the term "pliable" refers to a material supple enough to bend freely or repeatedly without breaking. "Ductile" refers to a material capable of being bent or pulled into different shapes. The term "composite" refers to a solid material which is composed of two or more substances having different physical characteristics and in which each substance retains its identity while contributing desirable properties to the whole; an example of a composite is plastic within which a fibrous material is embedded Disclosed is a novel combination of metal-to-metal seal and compression seal for use in fluid end assemblies on reciprocating pumps. The combination seal is used on the discharge and suction portion of the pump and provides for a better seal having less extrusion and leakage compared to prior art radial seals. Conventional pumps contain surface bore entries to the fluid end assembly which have radial seals involving D-rings, O-rings, or lip seals as examples of the seals to contain fluid within the assembly and maintain compression during use. D-rings, O-rings, or lip seals are all exterior surface seals. The present invention involves an interior or face seal.

The invention is directed to the combination of compression seal and metal-to-metal seal for the discharge bore and the suction bore of the fluid end. Therefore, the many interior components of the fluid end will not be discussed herein. But those of skill in the art recognize the interior components remain in existence and have not been modified except as needed to employ the seal combination of the invention. As a summary, and seen in FIG. 3, the fluid end interiors include, as primary components, spring actuated valves, inlet and outlet valves, seat decks, plungers and a crankshaft mechanism to perform the reciprocating motion in the plunger bore.

The metal to metal seal minimizes the extrusion gap (i.e., clearance between two metal pieces) for the compression seal. The metal to metal seal almost eliminates the extrusion gap to an amount significantly less compared to conventional radial seals for these bores in the fluid end assembly.

The retaining nut described herein is known in the art for use coupling a hammer union but not heretofore used with a fluid end assembly. Research and development to achieve the inventive combination seal to accommodate the fluid end assembly and accompanying pump and components was not obvious, as the entire assembly had to be refurbished to accommodate the seal. The seal combines a metal-elastomer-metal interface as well as a metal-to-metal interface. Upon initial seal installation, the elastomer is compressed by tightening the respective hammer lug nut to form a primary seal, which upon operation and use becomes further compressed such that the metal of the discharge cover seal element contacts and mates with the beveled metal surface of the matching bore to form a secondary seal. In some cases, the secondary seal is formed upon initial compression. The metal to metal seal formed minimizes or eliminates the leakage of fluid, oil, and/or media pumping through the fluid end assembly. While the initial compression forms a seal sufficient to eliminate or minimize leakage of fluid and media, the metal to metal seal is fully formed when the metal surfaces mate.

A seal herein is defined as the tight contact between two surfaces, and serves to maintain pressure with the fluid end assembly and to simultaneously contain fluid and media within the fluid end assembly.

FIG. 1 illustrates a front view of the prior art or conventional complete fluid end assembly 100. The gauge connection 104 found on the top portion of the illustration shows a port for placing a gauge for the fluid end assembly. The conventional assembly has recessed nuts 302 (see FIG. 3) which are standard and therefore not shown in FIG. 1.

Figure 2:
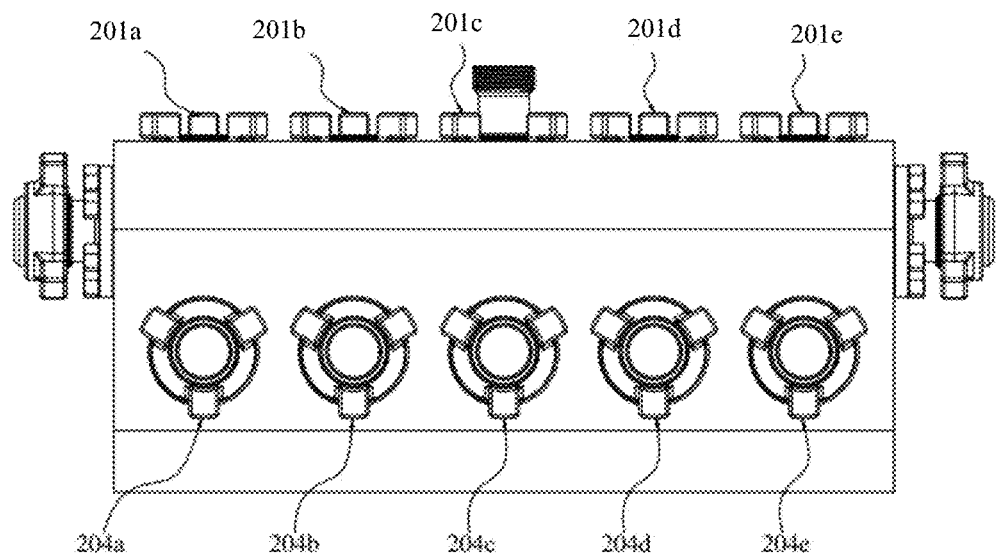
FIG. 2 illustrates a front view of an embodiment of the invention housing retaining nuts with lugs on the exterior surface of the fluid end assembly.

FIG. 2, 200, illustrates a front view of present invention. Shown are hammer lug nuts 201a-201e respectively, along the top portion of the assembly, next to the gauge connection 104 of the fluid end assembly. The inventive fluid end assembly has the lug nuts in all of the service ports 204a-204e so they are easily maintained and opened with just a hammer. Conventional fluid ends with their recessed nuts are shown in FIG. 1. In order to remove the recessed nuts of FIG. 1 for access to the interior and maintenance of the fluid end, the recessed nuts must be removed with the use of a hammer and a hex wrench. Here with the redesigned inventive fluid end having the compression seal, the hammer lugs are on the exterior of the fluid end and can be removed with just a hammer. Being on the exterior allows easier access to the interior of the fluid end and therefore easier, simpler maintenance of the fluid end. The use of one tool to help maintain the fluid end makes this design more efficient for the operator and simplifies the maintenance of the fluid end assembly.

Figure 3:
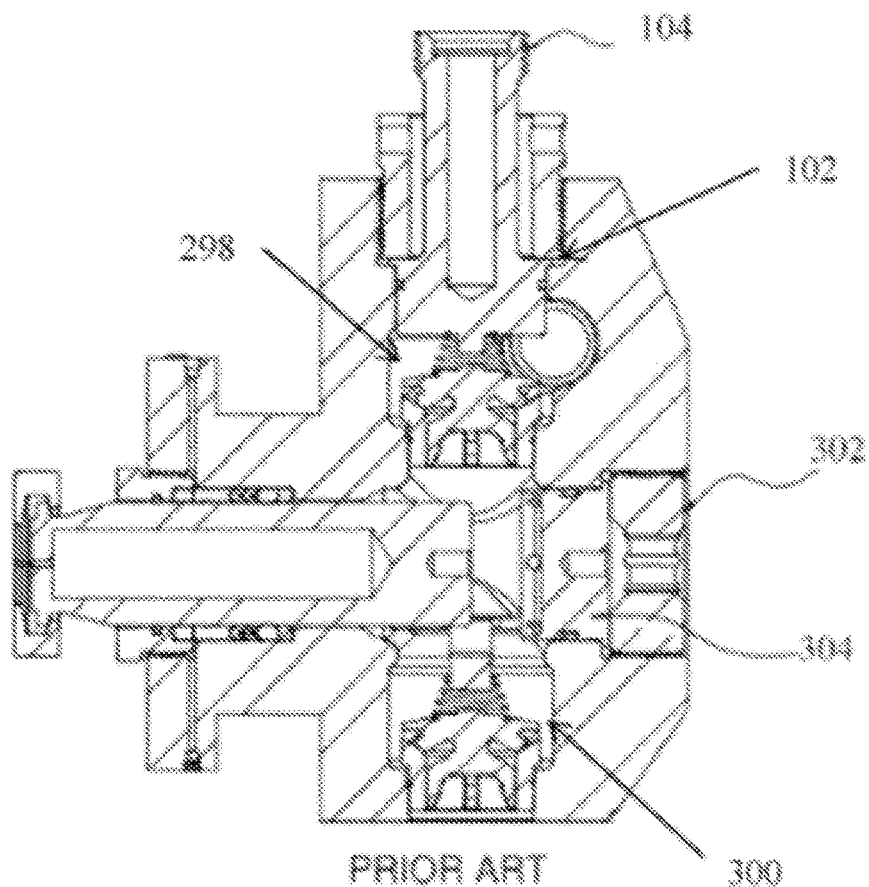
FIG. 3 illustrates a cross sectional view of the conventional fluid end assembly and pump showing the seal arrangement and internal hex, recessed nut arrangement.

FIG. 3 illustrates a cross sectional view of a conventional fluid end having a discharge bore 298, a suction bore 300, and a horizontal bore 304, wherein the top section is the gauge connection 104 having a small radial seal around the connection 104. The sealing arrangement of FIG. 3 shows the interior, recessed nuts 302 discussed above. This embodiment of a conventional fluid end shows two (2) different sizes of radial seals; a smaller one on the discharge covers 102, and a larger radial seal on the horizontal bore 304.

Figure 4:
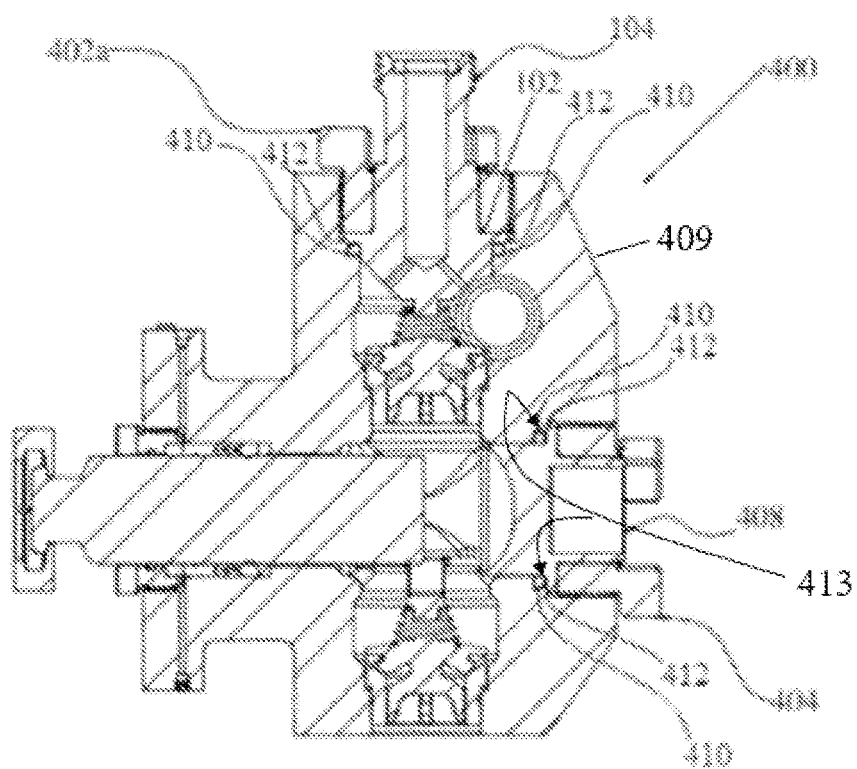
FIG. 4 illustrates a cross sectional view of the new design showing new discharge and suction bores with lug driven nuts, exterior to the fluid end assembly.
Figure 6:
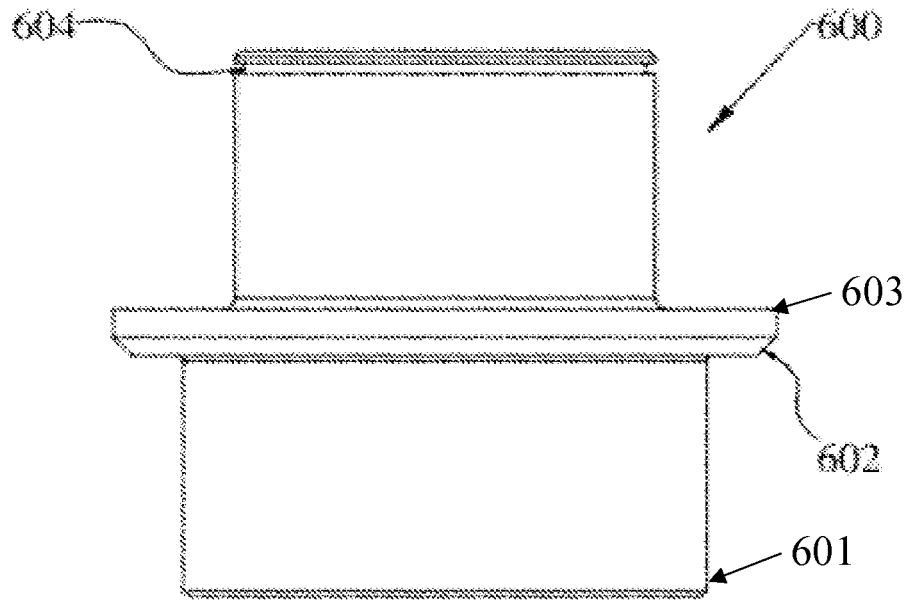
FIG. 6 illustrates a front view of an embodiment of the new suction cover having a narrower grooved top portion for housing the retainer ring, together with the metal to metal seal.

FIG. 4 illustrates a cross sectional view of an embodiment of the present invention, 400. Shown in FIG. 4 is a single seal and single nut 402. Illustrated is the gauge connection 104 now modified to accept a compression seal. There is a retaining ring 406 which keeps two pieces together (here the discharge cover and the nut). This novel approach and modification to the fluid end assembly results in improved operation of the pump, less leaKing, and extended maintenance cycles during operation. The lug nut 402 compresses the discharge cover 102. There is also a same size nut 404 shown to seal the service port 408. Shown in FIG. 4 are now discharge and suction seals of the pump having the same nut and the same seal, even in the gauge connection position. Keeping the nuts the same, including the same seal, simplifies inventory for the user including what is needed for future maintenance. FIG. 4 shows a seal groove 410 formed into the body 409 of the fluid end assembly at the end of the discharge bore 298 and the horizontal bore 304. Turning to FIG. 6, the cover (e.g., the suction cover 600) comprises a first portion 601 disposable within the end of the respective bore, and a second portion 603 too large to be disposed within the bore, also referred to as a large-radiused extremity comprising a metallic sealing element 602 (i.e., the second beveled mating surface 602) of suction cover 600 and discharge cover 601 (see FIGS. 6, 6B, 8, and 10) that meets and sealingly engages the first bevel mating surface 412 disposed into the body of the fluid end assembly at the end of the discharge bore 298 and the end of the horizontal bore 304, respectively, forming a metallic sealing element 413 at the intersection of the first beveled mating surface 412 and the second beveled mating surface of the corresponding cover 602, and the compression seal disposed within the seal groove 410 does not enter the extrusion gap between the two metallic sealing elements.

Figure 5:
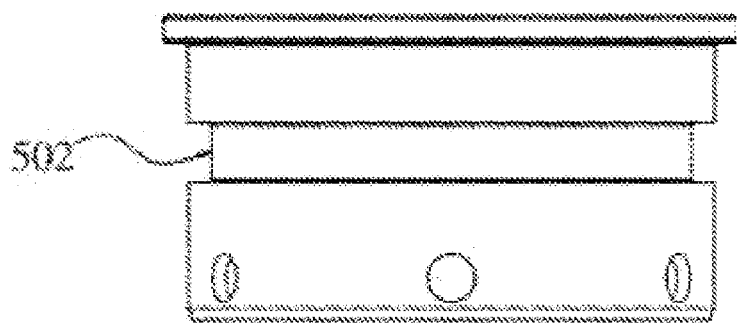
FIG. 5 illustrates a front view of a prior art, conventional suction cover showing the groove that houses a radial seal.

FIG. 5 illustrates the prior art suction cover. 502 illustrates the conventional groove found in the suction cover where a radial seal sits inside for compression and retention of fluids.

Figure 6A:
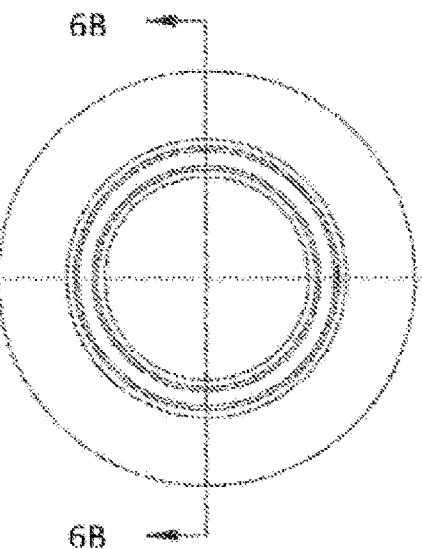
FIGS. 6A, 6B, and 6C are a plan view, a sectional view, and a perspective view, respectively, further illustrating the suction cover of FIG. 6.
Figure 6B:
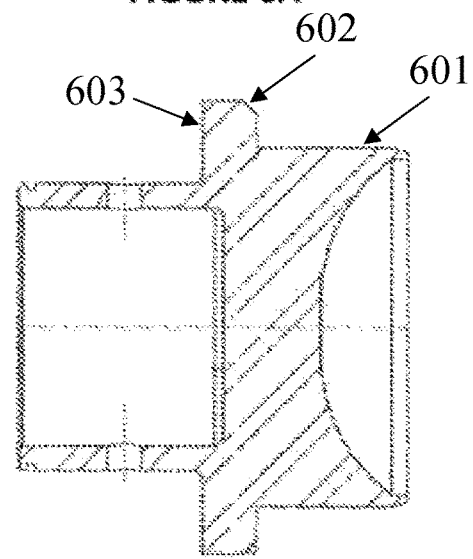
Figure 6C:
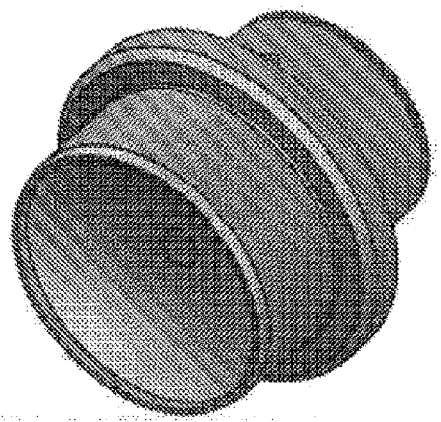

FIG. 6 illustrates the newly designed suction cover 600, having a large radius extremity 602 (i.e., a metallic sealing element extending radially from the circumference of the cover, also described as a metallic discoid) which is seen as rounded or beveled and forms the metal to metal seal. 602 has a radius of about 3 inches to 5 inches. The top portion of this embodiment 600 has a groove 604 to contain a retaining ring. The nut (not shown but equivalent to lug nuts 402 and 404) against suction cover 600 maintains compression on the suction bore seal. The retaining ring contained in groove 604 keeps the suction cover 600 together with nut during removal of the suction cover for maintenance. FIGS. 6A-6C further illustrate the inventive suction cover. While the suction cover illustrated in FIG. 6 has a concave inward facing surface, the surface may in some cases be flat or convex.

Figure 7:
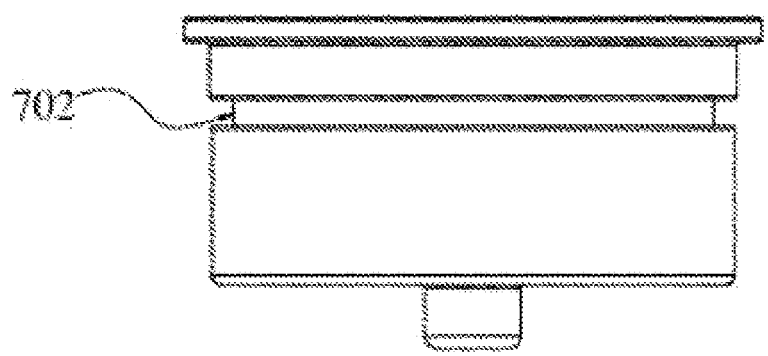
FIG. 7 illustrates a front view of a prior art discharge cap showing the groove for housing the radial seal.

FIG. 7 illustrates an alternate embodiment of the prior art discharge cover. Shown as 702 is the standard groove formed to house the typical radial seal for this type of cover.

Figure 8:
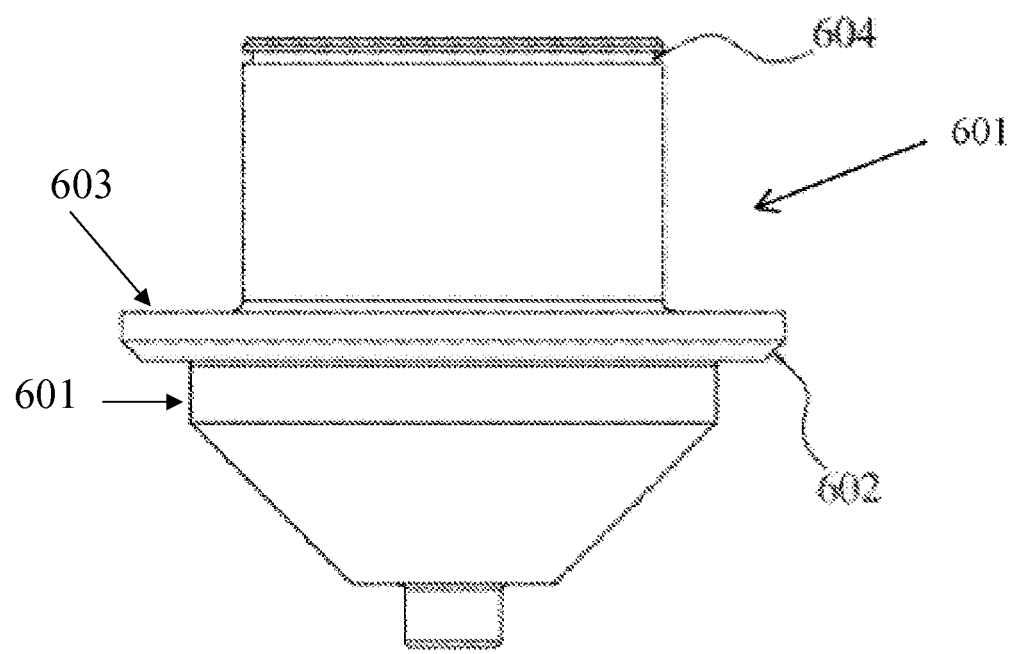
FIG. 8 illustrates a front view of an alternate conical design for the present invention showing the grooved end for a retainer ring and the metal to metal seal.

FIG. 8 illustrates a discharge cover 601 variation of the suction cover of FIG. 6. Note the new tapered shape illustrated which works in combination with recessed seat decks in the fluid end bore as discussed in more detail in copending application Ser. No. 15/978,745 herein incorporated by reference for related and relevant information. FIGS. 5 and 7 illustrate prior art embodiments, while FIGS. 6 and 8 illustrate the new designed suction and discharge caps having the large-radiused extremity 602, providing a metal to metal seal, and retaining ring groove 604.

Figure 9:
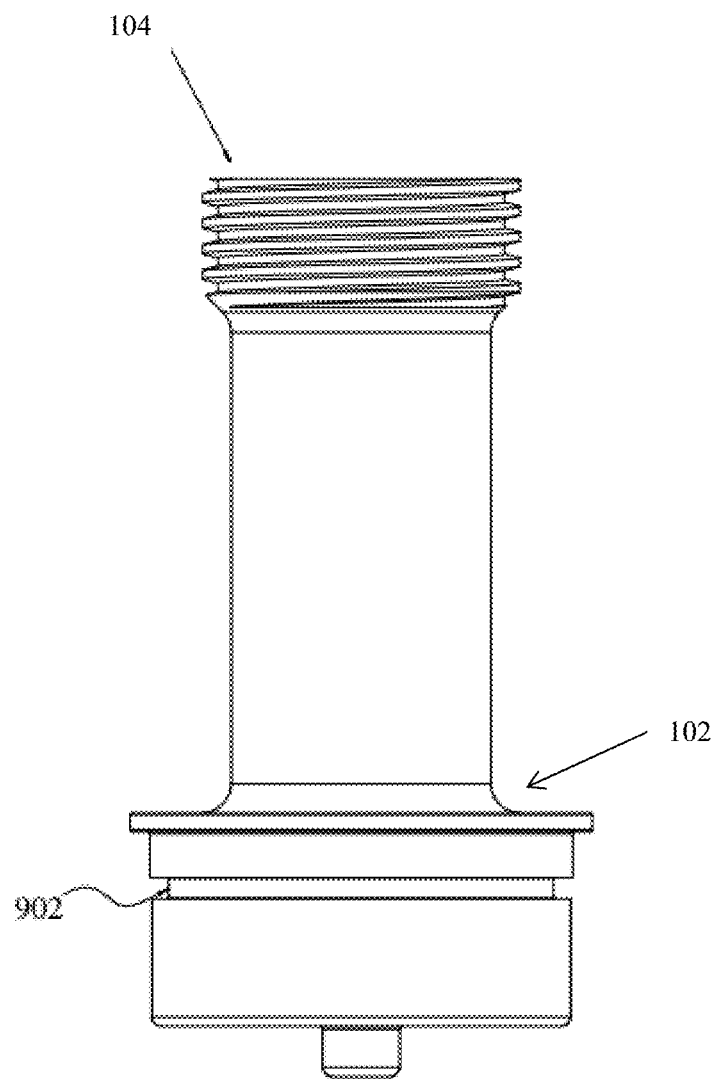
FIG. 9 illustrates an embodiment of the prior art for a gauge connection illustrating the groove for housing a radial seal.

FIG. 9 illustrates a prior art cover with gauge connection 104 and groove 902 for housing a radial seal.

Figure 10:
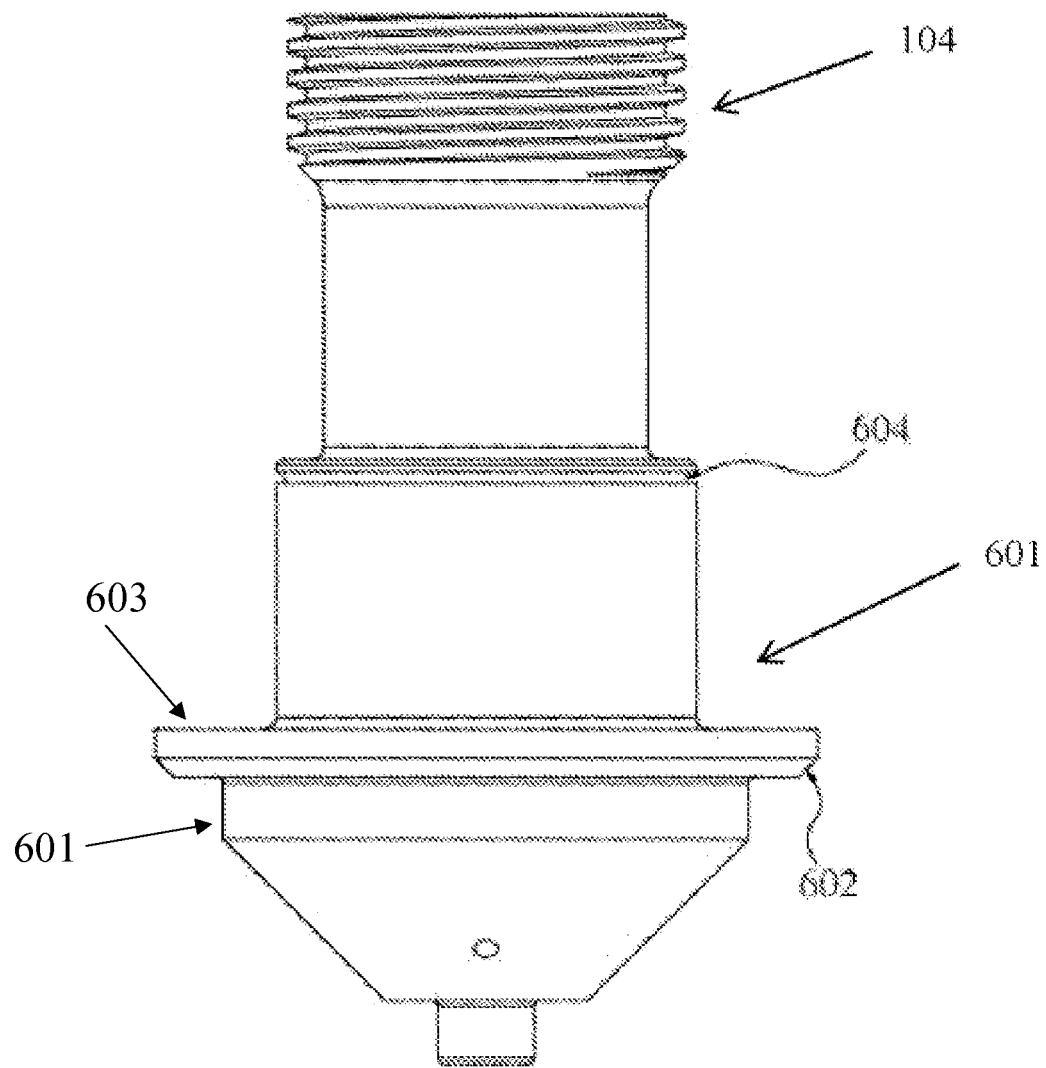
FIG. 10 illustrates an embodiment of the present invention for a gauge connection showing the conical discharge cap and a retaining ring groove in the middle section.

FIG. 10 illustrates a newly designed discharge cover 601 with gauge connector 104, a metal to metal seal provided by large-radiused extremity 602, and a retaining ring groove 604. FIGS. 9 and 10 gauge connections house a port for a gauge for the fluid end assembly.

Figure 11:
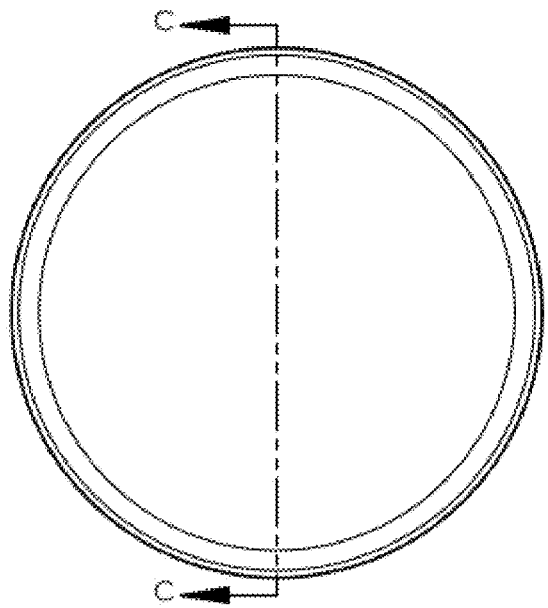
FIG. 11 illustrates a plan view of an existing radial seal showing a D-ring.
Figure 12:
FIG. 12 illustrates a sectional view of the radial seal of FIG. 11.

FIG. 11 illustrates a plan view embodiment of an existing or conventional radial seal showing a D-ring, the most commonly used for reciprocating pump sealing bore applications. FIG. 12 illustrates a cross sectional view of the radial seal of FIG. 11 and shows the D-shape. Note the tips of FIG. 12 illustrate the curved or beveled edging commonly seen on D-rings. For these types of radial seals, FIGS. 11 and 12 show the sealing surface being on the outer radius. While a D-ring is illustrated, those of skill in the art recognize that an O-ring or lip seal are equivalents.

Figure 13:
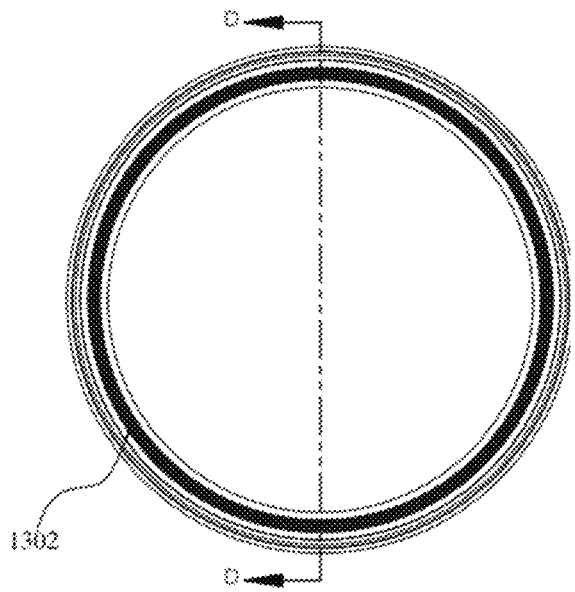
FIG. 13 illustrates a plan view of an embodiment of the present invention with a textured or ribbed front face and an integrated metal backup ring.
Figure 13A:
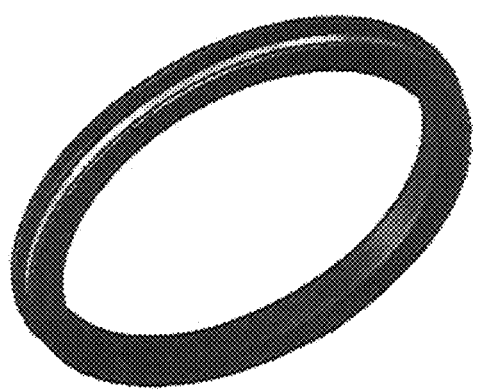
FIG. 13A provides a perspective view further illustrating the compression seal of FIG. 13.
Figure 14:
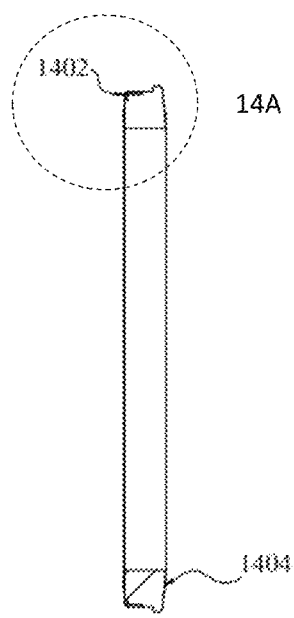
FIG. 14 illustrates a cross section of the textured or ribbed faces of FIG. 13 further showing the brass backup ring.
Figure 14A:
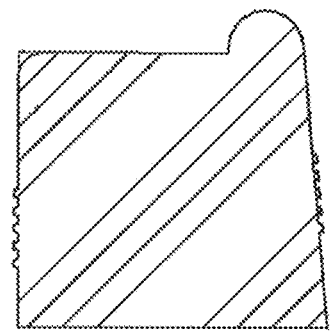
FIG. 14A is an enlarged view of a detail of FIG. 14.

FIG. 13 illustrates a plan view embodiment of the modified compression seal of the present invention. Here, the inside and outside faces are textured or herein shown as ribbed so as to prevent material contamination on either face of the seal. 1302 shows the texturing or ribbings of the seal. Alternatives to the ribbing include stepping or waving. Although FIG. 13 illustrates a textured surface, in some cases, the seal is not textured. FIG. 14 illustrates a planar cross section of FIG. 13. An embodiment includes a brass backup as shown on the tip 1402, and 1404 to prevent extrusion of the seal through the extrusion gap. The seal can be made of a variety of elastomeric materials including but not limited to thermoplastic elastomers, natural rubber, pliable composites, nitriles, Teflon®, Kevlar®, or urethane, or combinations thereof. These materials are generally pliable or ductile, although the composite or metal is not limited with respect to pliability or ductility. During servicing, the compression seal is placed within the fluid end assembly prior to inserting the discharge or suction cover and lug nut. As the nut is tightened, the elastomeric seal is compressed. Once the elastomeric seal is fully compressed, the metal surface of the cover seal is brought into direct contact with the mating surface of the corresponding bore. FIGS. 13A and 14A further illustrate the inventive compression seal.

While brass is disclosed herein as a preferred metal and used for descriptive purposes, other metals may be employed. For example, metals which can be used are those with pliable characteristics but will withstand the stress and corrosive environment of a fluid end assembly during use. The metal must be capable of compression without destruction. Besides brass, other exemplary metals include stainless steel, Inconel®, carbon steel.

Figure 15:
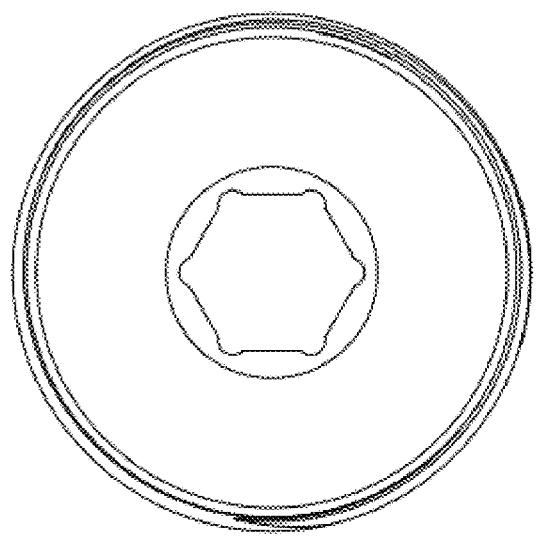
FIG. 15 illustrates a front view of a prior art retaining nut.
Figure 16:
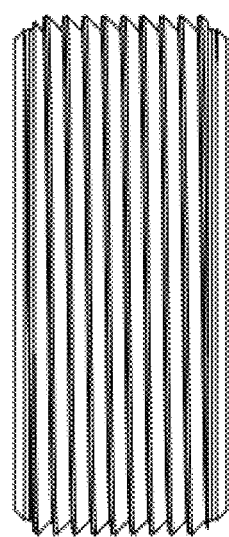
FIG. 16 illustrates a side view of the prior art retaining nut of FIG. 15.

FIG. 15 illustrates the front view of the existing or prior art retainer nut. The interior hexagon shape requires a hexagonal wrench to remove the nut when any type of maintenance is needed for the fluid end assembly. FIG. 16 illustrates a side view of the FIG. 15 nut and illustrates its complete threaded state and absence of lugs.

Figure 17:
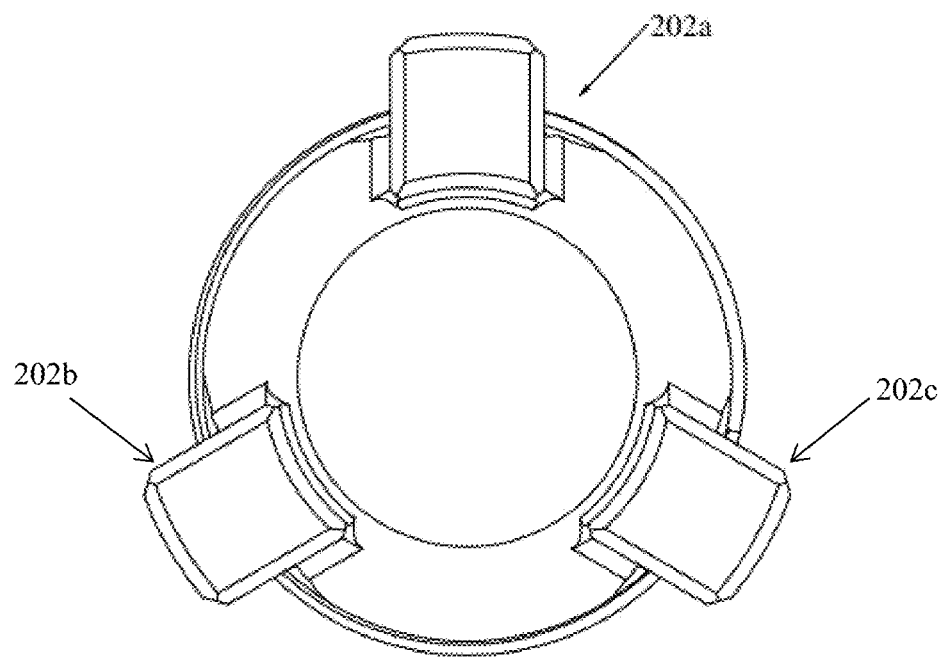
FIG. 17 illustrates a front view of the inventive retaining nut showing the lugs along the edges of the nut.

FIG. 17 illustrates a front view of an embodiment of the inventive retaining nut. The lugs 202*a-c* can be seen with this new retaining nut. The retaining nuts depicted in FIG. 17 can be machined from solid bar stock or machined from a net shape forging.

Figure 18:
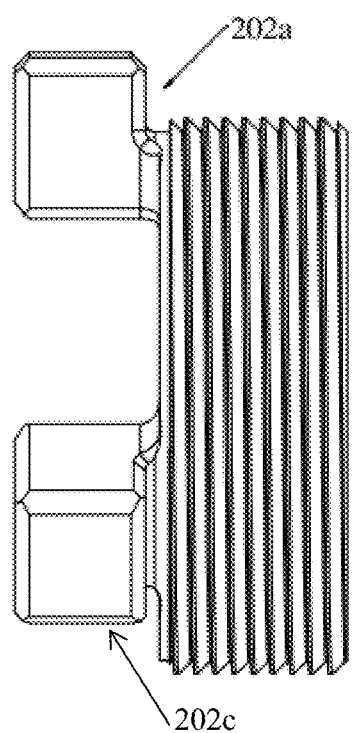
FIG. 18 illustrates a side view of FIG. 17 and shows the lug protruding.

FIG. 18 illustrates a side view of the lugs 202*a* and 202*c* of FIG. 17. It is apparent that the lugs are on the exterior of the fluid end assembly. The lugs are used in conjunction with a hammer to tighten the lug. The retaining nut presses against the suction cover 600 or the discharge cover 601 and retaining ring at groove 604 and presses the large-radiused sealing portion 602 into a bevel on the fluid end to form the metal to metal seal. The bevel on the fluid end matches a bevel on the large-radiused extremity of the suction cover or discharge cover. The angle of the bevel may be, for example, 45°. To remove these inventive lug nuts requires a hammer. Using a hammer is easier and more efficient for the operator of the fluid end assembly than having to carry and use three different tools to open the fluid end assembly. The prior art/conventional assembly required use of a hammer, wrench, and cap puller. This efficiency in time for the operator also yields efficiency for the pump itself, as this combination metal to metal seal and compression seal results in less weakening or degradation of the seals and subsequent fluid leaks within the fluid end assembly.

EXAMPLES

The use of the current inventive compression seal in a fluid end offers solutions to the aforementioned issues. This type of seal does not rely on radial compression and does not have to be forced into a small radial gap around the sealing plug. This makes installation and removal easier and quicker by eliminating the need for a specialized puller. The plug can be installed and removed by hand.

It has been shown through field trials that the inventive compression seal does not leak within common maintenance cycles. Fluid ends are commonly maintained when valve and seat components are replaced. This often occurs after 50-60 hours of operation.

Comparative Example 1

D-Ring-Radial Seal:
Location: Odessa, Tex.
Operating pressure: 9,000-11,000 psig
Sand Count: Approx. 210,000 lbs. per stage
Stage Length: Approx. 2 hours D-Ring stage count (seal life) was erratic. Seals lasted from 1-10 stages. Seal life varied widely depending on the age of the fluid end and extent of sealing area washout or wear. Fluid ends that had extensive leaking before had significantly diminished seal life. D-rings were changed more frequently than valves and seats.

Example 1

Compression seal
Location: Gonzalez, Tex.
Operating pressure: 9,000-10,000 psig
Sand Count: Approx. 610,000 lbs. per stage Stage Length: Approx. 4 hours
Total Number of Stages Tested: 72 (Approx. 280 hours)

The seals that were installed at the start of the test exceeded the length of two valve and seat maintenance intervals and continued to operate without any leaks.

Example 2

Compression seal
Location: Odessa, Tex.
Operating pressure: 8,500-9,000 psig
Sand Count: Approx. 210,000 lbs. per stage
Stage Length: Approx. 2 hours
Total Number of Stages Tested: 112 (Approx. 224 hours)

The seals that were installed at the start of the test went two valve and seat maintenance intervals without any leaks. Use of this sealing arrangement reduced the length of valve and seat maintenance of typical fluid ends from 45-60 minutes to 20-30 minutes, a reduction of approx. 50%.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

The invention claimed is:

1. A seal for use with a fluid end assembly for a reciprocating pump that receives fluid through an inlet bore, and ejects fluid from an outlet bore, the fluid end assembly comprising:
   a body;
   a plunger bore formed in the body along a first axis;
   a suction bore formed in the body along a second axis, wherein the suction bore receives fluid from a conduit;
   a discharge bore formed in the body, aligned perpendicular to the plunger bore and designed to receive a discharge cover;
   a horizontal bore formed in the body and aligned with the plunger bore, wherein the plunger bore, the suction bore, the discharge bore, and the horizontal bore intersect to form a cavity;
   a reciprocating plunger that reciprocates in the plunger bore;
   an inlet valve received by the suction bore for facilitating flow of the fluid from the conduit into the cavity by way of the suction bore;
   a first valve seat deck at an end portion of the suction bore and in contact with the inlet valve;
   a pressure relief valve received by the discharge bore for facilitating flow of the fluid from the cavity into the discharge bore;
   a discharge cover received by the discharge bore and in contact with the pressure relief valve;
   a suction cover received by the horizontal bore;
   a second valve seat deck at an end portion of the discharge bore and in contact with the pressure relief valve; and
   an outlet cavity that is defined at an inner surface of the discharge bore and provides a passage for flow of the fluid from the discharge bore to a pump outlet;
   the pump outlet is cylindrical and is aligned along a third axis, wherein the inlet valve allows the fluid to flow into the cavity based on a reciprocating motion of the reciprocating plunger by way of the suction bore, wherein the pressure relief valve allows the fluid to flow from the cavity to the discharge bore based on the reciprocating motion of the reciprocating plunger;
   wherein further at least one of the discharge bore and the horizontal bore comprises a seal groove disposed into the body located at an end of the respective bore, the seal groove being bound on at least two sides by the body, and open to the respective bore and the end of the respective bore;
   a first beveled mating surface disposed into the body radially arranged about and coaxial with the end of the respective bore that begins at a point equal to or away from a point where the seal groove ends;
   the respective cover comprising a first portion disposable within the end of the respective bore, and a second portion comprising a metallic sealing element extending radially away from a circumference of the cover comprising a second beveled mating surface dimensioned and arranged to sealingly engage the first beveled mating surface on the body when the first portion of the respective cover is disposed within the end of the respective bore; and
   a compression seal dimensioned and arranged to fit only partially within the seal groove when the first portion of the respective cover is disposed within the end of the respective bore such that when the respective cover is biased toward the body, the compression seal is compressed within the seal groove to form a sealing engagement between the seal, the body, the first portion of the respective cover and the second portion of the respective cover, and the first beveled mating surface sealing engages the second beveled mating surface to produce a metal to metal sealing engagement between the body and the second portion of the cover.

2. The seal of claim 1, wherein the suction and discharge covers are secured into the fluid end assembly and biased against the body using retainer nuts having a plurality of lugs such that when the retainer nuts are struck upon their lugs, the retainer nuts tighten against the covers, providing the necessary biasing force to compress the compression seal within the seal groove and to produce the metal to metal sealing engagement between the first beveled mating surface and the second beveled mating surface.

3. The seal of claim 2, wherein the lugs of each retainer nut are designed to remain outside of the fluid end assembly when the retainer nut is fully tightened.

4. The seal of claim 1, wherein the compression seal comprises an elastomer selected from the group consisting of a thermoplastic elastomer, a natural rubber, a urethane, a pliable composite, and a combination thereof.

5. The seal of claim 1, wherein the compression seal is reinforced with a material selected from the group consisting of a metal, a rigid polymer, a pliable composite, and a combination thereof.

6. The seal of claim 1, wherein the suction and discharge covers have a mid-height diameter of 3 inches to 12 inches and wherein the second beveled mating surface on at least one of the suction cover and the discharge cover and the first beveled mating surface on the body of the fluid end assembly comprise an angle from about 35 degrees to about 55 degrees.

7. A reciprocating pump fluid end assembly, comprising:
a body comprising:
a plunger bore aligned with a horizontal bore and
a suction bore aligned with a discharge bore, perpendicular to the alignment of the plunger bore and horizontal bore;
a suction cover positioned partially within an end of the horizontal bore;
a discharge cover positioned partially within an end of the discharge bore; and
a compression seal dimensioned and arranged to fit only partially within a seal groove disposed into the body located at an end of the respective bore which is bound on at least two sides by the body, and open to the corresponding bore and the end of the bore;
a first beveled mating surface disposed into the body radially arranged about and coaxial with the end of the respective bore that begins at a point on the body equal to or away from a point where the seal groove ends;
the respective cover comprising a first portion disposable within the end of the respective bore, and a second portion comprising a metallic sealing element extending radially away from a circumference of the cover comprising a second beveled mating surface dimensioned and arranged to sealingly engage the first beveled mating surface on the body when the first portion of the respective cover is disposed within the end of the respective bore; and
wherein a biasing force applied to the corresponding cover toward the body compresses the seal within the seal groove to form a sealing engagement between the body, the first portion of the cover, and the second portion of the cover, and the first beveled mating surface sealing engages the second beveled mating surface to produce a metal to metal sealing engagement between the body and the second portion of the corresponding cover.

8. The reciprocating pump fluid end assembly of claim 7, wherein full compression of the compression seal between the suction cover and the seal groove eliminates a gap between the first beveled mating surface of the body and the second beveled mating surface of the suction cover.

9. The reciprocating pump fluid end assembly of claim 7, wherein full compression of the compression seal between the discharge cover and the seal groove is sufficient to eliminate a gap between the first beveled mating surface of the body and the second beveled mating surface of the discharge cover.

10. The reciprocating pump fluid end assembly of claim 7, wherein the fluid end assembly is further provided with a plurality of nuts, such that the suction cover is secured in the horizontal bore with a tightened nut and the discharge cover is secured in the discharge bore with a tightened nut.

* * * * *